H. M. UNDERWOOD.
Barbed-Fence.
No. 206,754. Patented Aug. 6, 1878.
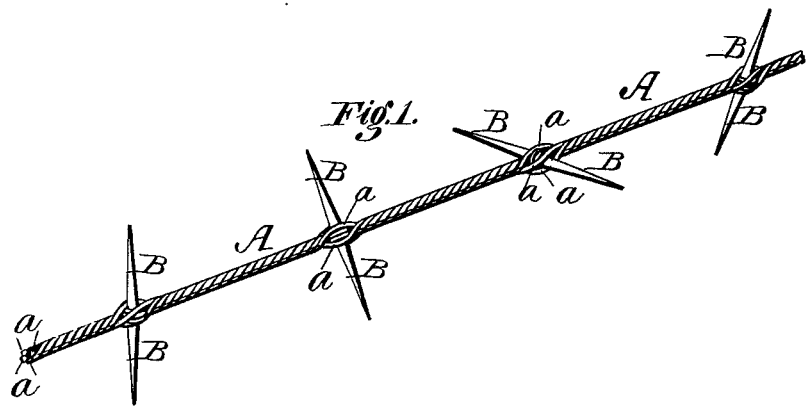
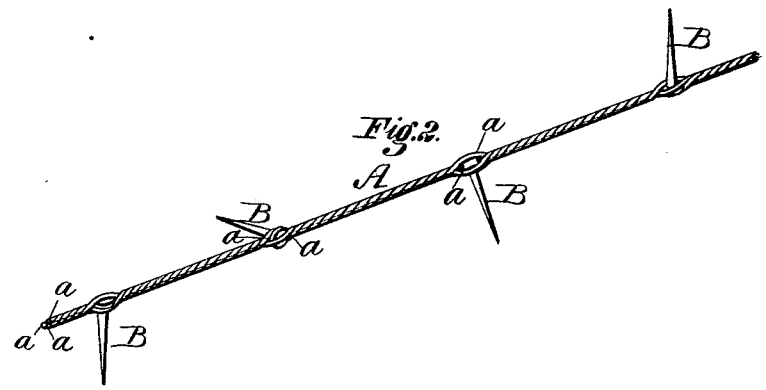
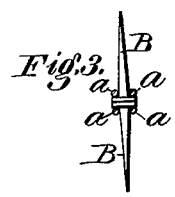
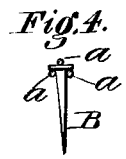
Witnesses:
Inventor:
H. M. Underwood
By his Attys.
Dodge & Son

UNITED STATES PATENT OFFICE.

HENRY M. UNDERWOOD, OF KENOSHA, WISCONSIN, ASSIGNOR TO HIMSELF, URBAN J. LEWIS, COURTLAND A. DEWEY, AND GEORGE HALE.

IMPROVEMENT IN BARBED FENCES.

Specification forming part of Letters Patent No. 206,754, dated August 6, 1878; application filed July 12, 1878.

*To all whom it may concern:*

Be it known that I, H. M. UNDERWOOD, of Kenosha, in the county of Kenosha and State of Wisconsin, have invented certain Improvements in Barbed Fences, of which the following is a specification:

The object of this invention is to produce a barb fence-wire which shall be extremely cheap to manufacture, and which shall have its barbs attached in such manner as to prevent their accidental displacement; and to this end the invention consists in constructing the wire of a series of strands twisted together, and combining therewith ordinary cut tacks, such as are commonly known and sold in the market, the tacks being arranged either singly or in pairs, as hereinafter described.

Figure 1 represents a perspective view of my improved wire, having the tacks arranged in pairs; Fig. 2, a perspective view of the wire, having single tacks; Figs. 3 and 4, cross-sections on the lines $x\ x$ and $y\ y$ of Figs. 1 and 2, respectively.

A represents the main wire, consisting of three, four, or more strands or small wires, $a$, twisted together in such manner as to form a single cable or main wire.

B represents the barbs, consisting of the ordinary flat-headed sharp-pointed tacks, sold in the market under the different denominations of cut tacks, carpet-tacks, &c. The tacks may be of any ordinary form, provided only they have enlarged and flattened heads. They are secured in place by forcing them between two of the strands until the head rests thereon, and then passing one or more of the remaining strands over or across the head to retain it in place. The manner of inserting the tacks and of applying the wire to hold the same may be modified as desired, and the introduction of the tacks may take place either at the time of twisting the wire or subsequently, it being preferred, however, to introduce them during the operation of uniting the strands, the twisting operation being suspended at the proper point to permit the introduction of the tack, and then resumed after the tack is in position to secure the same in place. When the tacks are arranged in pairs, they are placed, head to head, firmly against each other, with their points extending in opposite directions, and then embraced between four strands, in the manner shown in Figs. 1 and 3; but when arranged singly they are inserted between two strands, and the third strand passed over the back or outside of the head, as shown in Figs. 2 and 4.

I am aware that barbed wires consisting of several strands having barbs embraced between them are old, and therefore I lay no claim to the broad idea of securing barbs between the strands of the wire; but What I do claim is—

1. The barbed wire consisting of ordinary merchantable tacks B, secured between strands $a$, twisted together, substantially as described and shown.

2. The barbed wire consisting of tacks arranged in pairs, with their heads against each other, and secured by four strands, $a$, twisted together, substantially as described and shown.

HENRY M. UNDERWOOD.

Witnesses:
 EDWARD CURRY,
 FRANK BROWN.